United States Patent
Negishi et al.

(10) Patent No.: US 7,915,787 B2
(45) Date of Patent: Mar. 29, 2011

(54) ACTUATOR

(75) Inventors: Mahito Negishi, Tachikawa (JP); Takao Yokomatsu, Yokohama (JP); Ken Meisho, Yokohama (JP); Seiichi Hata, Yokohama (JP); Akira Shimokohbe, Yokohama (JP); Dongming Sun, Yokohama (JP); Sheng Wang, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 12/169,575

(22) Filed: Jul. 8, 2008

(65) Prior Publication Data

US 2009/0021113 A1  Jan. 22, 2009

(30) Foreign Application Priority Data

Jul. 20, 2007 (JP) ................................. 2007-189001
Jun. 13, 2008 (JP) ................................. 2008-155357

(51) Int. Cl.
*H01L 41/08* (2006.01)

(52) U.S. Cl. .................... 310/323.02; 310/317

(58) Field of Classification Search ............... 310/323.03
See application file for complete search history.

(56) References Cited

U.S. PATENT DOCUMENTS

| 4,453,103 A * | 6/1984 | Vishnevsky et al. ...... 310/323.02 |
| 4,560,263 A | 12/1985 | Katsuma et al. |
| 5,332,941 A * | 7/1994 | Honda ...................... 310/323.02 |
| 6,188,161 B1 * | 2/2001 | Yoshida et al. ............... 310/328 |
| 6,768,245 B2 * | 7/2004 | Mock et al. .............. 310/323.02 |
| 7,105,987 B2 * | 9/2006 | Witteveen ..................... 310/328 |

FOREIGN PATENT DOCUMENTS

| JP | 4-72471 | 11/1992 |
| JP | 5-49273 | 2/1993 |
| JP | 10-210776 | 8/1998 |

OTHER PUBLICATIONS

Chinese Office Action dated May 12, 2010 in corresponding Chinese Application No. 200810133663.5, and translation thereof.
Kuribayashi et al., "Excitation Conditions of Flexural Traveling Waves for a Reversible Ultrasonic Linear Motor", J. Acoust. Soc. Am. 77 (4), Apr. 1985.

* cited by examiner

*Primary Examiner* — Mark Budd
(74) *Attorney, Agent, or Firm* — Fitzpatrick, Cella, Harper & Scinto

(57) ABSTRACT

A cylindrical piezoelectric element is arranged to share an axis with a cylindrical vibrator having different diameters at central and end portions to fix the vibrator forming a gap at the central portion. Vibration voltages are applied across first electrodes on the piezoelectric element and the vibrator, namely, a second electrode, to vibrate the vibrator and bring a wave front of a traveling wave into contact with a tubular member, i.e., a supporting member fitted to the vibrator. Friction at a contact portion of the vibrator moves a mover including the vibrator and the piezoelectric element in an axial direction of the tubular member. By amplifying the vibration amplitude using the vibrator provided separately from the piezoelectric element, a small actuator capable of performing high-speed driving is realized.

20 Claims, 12 Drawing Sheets

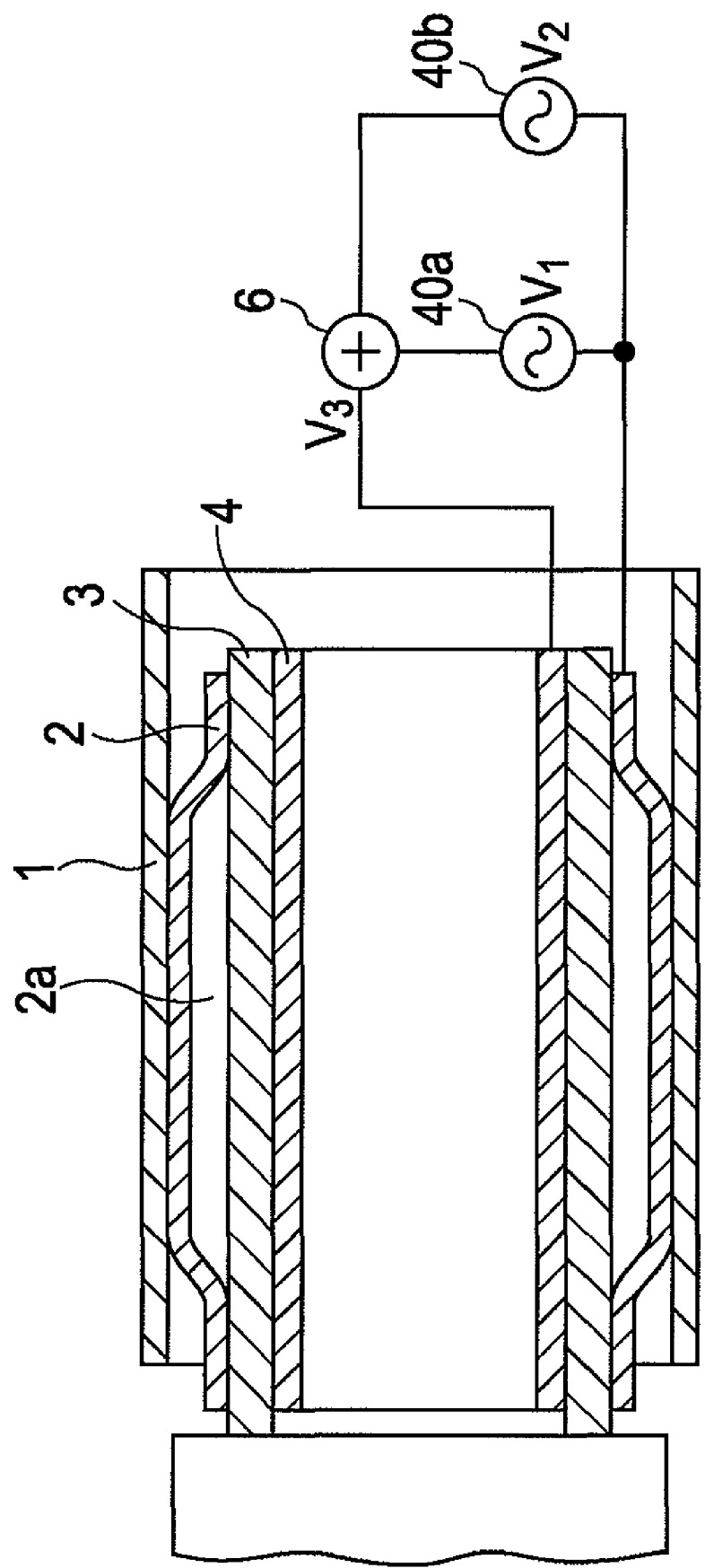

ACTUATOR

BACKGROUND OF THE INVENTION

1. Field of the Invention

The present invention relates to vibration-utilizing linear actuators that can be applied to driving of fingertips of a robot hand or the like.

2. Description of the Related Art

Regarding actuators using a vibrator and a piezoelectric element, some configurations, such as an ultrasonic motor, are known. In particular, realization of movement of fingertips of a robot hand using the actuators requires realization of a small linear motion mechanism, which corresponds to the human muscle.

Japanese Patent Publication No. 4-72471 discloses a structure of a rotary ultrasonic motor. Realization of movement of fingertips of a robot hand with a rotary motor disclosed in Japanese Patent Publication No. 4-72471 requires a rotary-to-linear-motion converting mechanism, such as a screw, which makes it difficult to reduce the size.

In that respect, since a linear actuator using ultrasonic vibration can realize linear movement with a small structure, the actuator is preferable for controlling fingertips of a robot hand. In particular, a long and thin tubular (cylindrical) linear actuator utilizing vibration of a piezoelectric element is capable of handling an increase in the speed of movement of a robot, an increase in the stroke, and an increase in the accuracy. Progress has recently been made in a study of such a linear actuator.

The following describes such a cylindrical linear actuator.

FIGS. 14A and 14B show an ultrasonic motor of rotary-and-linear-motion-integrated type and an electronic device including the same as disclosed in Japanese Patent Laid-Open No. 10-210776. The ultrasonic motor includes a cylindrical stator 101 and a cylindrical mover 102 in contact with an inner or outer surface of the stator 101. The stator 101 has a cylindrical piezoelectric element 103, a plurality of polarization electrodes 104 regularly arranged on one of the inner surface and the outer surface of the piezoelectric element 103, and a whole surface electrode 107 provided on the other surface. The mover 102 is driven by ultrasonic vibration generated in the stator 101. In this case, the mover 102 can be driven freely in rotary and linear directions by selectively applying a plurality of kinds of out-of-phase alternating voltage to the polarization electrodes 104.

FIG. 15 shows an ultrasonic linear motor disclosed in Japanese Patent Laid-Open No. 5-49273. This ultrasonic linear motor includes a first piezoelectric element 203a that vibrates in parallel to the traveling direction, a shaft 201 that penetrates through the first piezoelectric element 203a, and second and third piezoelectric elements 203b and 203c that are arranged to sandwich the first piezoelectric element 203a and to be able to hold the shaft 201, and that vibrate vertically to the traveling direction. A gap is provided between the first piezoelectric element 203a and the shaft 201 in a radial direction. The second and third piezoelectric elements 203b and 203c are set so that a tightening margin and a gap exist between the piezoelectric elements 203b and 203c and an outside diameter of the shaft 201 at the time of shrinkage and expansion, respectively. The driving speed can be changed by changing a phase difference of alternating voltages applied to the piezoelectric elements.

In general, a vibration actuator according to the related art vibrates either the mover or the stator as a vibrator to generate a friction-based driving force (thrust) in the traveling direction at a contact portion of the mover and the stator.

In an ultrasonic motor of rotary-and-linear-motion-integrated type disclosed in Japanese Patent Laid-Open No. 10-210776, a mover can be driven freely in rotary and linear directions by selectively applying a plurality of kinds of alternating voltage to a piezoelectric element to vibrate the piezoelectric element.

Additionally, in an ultrasonic linear motor disclosed in Japanese Patent Laid-Open No. 5-49273, driving is realized in the linear direction by alternating voltage applied to a first piezoelectric element.

However, since the vibrator is constituted by the piezoelectric element in the ultrasonic motors disclosed in Japanese Patent Laid-Open Nos. 10-210776 and 5-49273, the following unsolved problems exist.

1) Design Flexibility

At the time of design and manufacture of an actuator utilizing vibration of a vibrator, the shape of the vibrator and the shape and frequency of a natural vibration mode are essential design parameters directly related to the thrust and the speed of movement. However, since a piezoelectric element is a sintered body, the piezoelectric element does not have a mechanical strength of metal, and mechanical processing methods therefor are also limited. Accordingly, in ultrasonic motors disclosed in Japanese Patent Laid-Open Nos. 10-210776 and 5-49273 which form a vibrator with a piezoelectric element, the design flexibility of realizing the large thrust and the high-speed movement decreases.

2) Durability of Vibrator

To realize the high-speed driving, a vibrator has to be vibrated at a significantly high speed in an actuator utilizing vibration. Accordingly, in view of the durability of the actuator, a material of the vibrator has to be resistant to repeated deformation and a structure of the vibrator is preferably simple and irrefrangible. In addition, the material of the vibrator has to have small internal damping in consideration of heat generated in the material.

Nevertheless, in ultrasonic motors disclosed in Japanese Patent Laid-Open Nos. 10-210776 and 5-49273 which form a vibrator with a piezoelectric element, since the vibrator has a complex structure in which electrodes sandwich the vibrator, and a large-amplitude vibration at a high frequency causes pealing of the electrodes, the vibrator thus cannot realize high durability. In addition, since the piezoelectric element has large internal damping, high-speed large-amplitude vibration undesirably increases an amount of generated heat.

3) Contact Force of Vibrator

In addition, since a friction force serving as a driving force is generated in an actuator utilizing vibration, a contact force for keeping a vibrator close to a stator is needed. If this contact force is too weak, the friction force, namely, the driving force, decreases. If the contact force is too strong, the force disturbs vibration of the vibrator and decreases the durability undesirably. Accordingly, it is important to keep the contact force constant in vibration actuators. In the case of cylindrical linear actuators, this contact force is compensated by a fitting accuracy of the vibrator and a circular tube serving as a stator.

The fitting accuracy of the vibrator and the circular tube significantly changes depending on heat generated in a piezoelectric element and a change in an atmosphere temperature. Thus, a piezoelectric material constituting the vibrator and a material of the stator or the mover preferably have thermal expansion coefficients that are as equal to one another as possible. However, since the circular tube is generally made of metal or the like, a significant difference exists between the thermal expansion coefficients when the vibrator is made of a piezoelectric material, which thus increases an influence of heat.

4) Vibration Amplitude and Movement Speed of Vibrator

In general, a deformation ratio of a piezoelectric element is substantially equal to $10^{-5}$. Accordingly, when a piezoelectric element having a diameter of 2 mm is used, deformation of only $2 \times 10^{-5}$ mm=20 nm is caused. Since surface roughness of the piezoelectric element is much larger than 20 nm, realization of a small linear motion actuator having a diameter of 2 mm or the like is difficult.

In addition, the speed of movement in the traveling direction is equal to the product of the driving frequency and the amplitude. Therefore, a small vibration amplitude value equates to a slow movement speed. When the diameter of the piezoelectric element is 2 mm, the amplitude in the circumferential direction is 20 nm, and the component in the traveling direction is $1/10$ thereof, the movement speed of the vibrator driven at 50 kHz is 20 nm×$1/10$×50 kHz=0.1 mm/s, which is significantly slow.

The vibrator needs to be vibrated at a large amplitude to realize the high-speed movement. However, if the amplitude becomes too large, fluid, such as air existing in a gap adjacent to a contract portion, is compressed and pressure thereof undesirably levitates the vibrator (ultrasonic levitation). As a result, friction is not generated at the contact portion and the thrust cannot be obtained. That is, large-amplitude vibration undesirably decreases the thrust.

SUMMARY OF THE INVENTION

In view of the unsolved problems involved in the related art, the present invention provides an actuator having a small and simple structure and capable of performing stable high-speed driving.

According to one aspect of the present invention, an actuator that moves a mover along a supporting member includes a mover. The mover includes a tubular or plate-like piezoelectric element, a first electrode provided on a first surface of the piezoelectric element, a second electrode provided on a reverse surface to the first surface of the piezoelectric element, and a vibrator having ends which are fixed to the piezoelectric element and a vibration portion which vibrates between the supporting member and the piezoelectric element. In the actuator, a vibration voltage is applied across the first electrode and the second electrode to vibrate the piezoelectric element, the vibration of the piezoelectric element is amplified by the vibrator, and the vibration portion is brought into contact with the supporting member, which thereby moves the mover.

Further features of the present invention will become apparent from the following description of exemplary embodiments with reference to the attached drawings.

BRIEF DESCRIPTION OF THE DRAWINGS

FIG. 7 is a sectional view showing an actuator according to a fourth exemplary embodiment of the present invention.

DESCRIPTION OF THE EMBODIMENTS

Exemplary embodiments of the present invention will be described with reference to the attached drawings.

First Exemplary Embodiment

Figure 1:
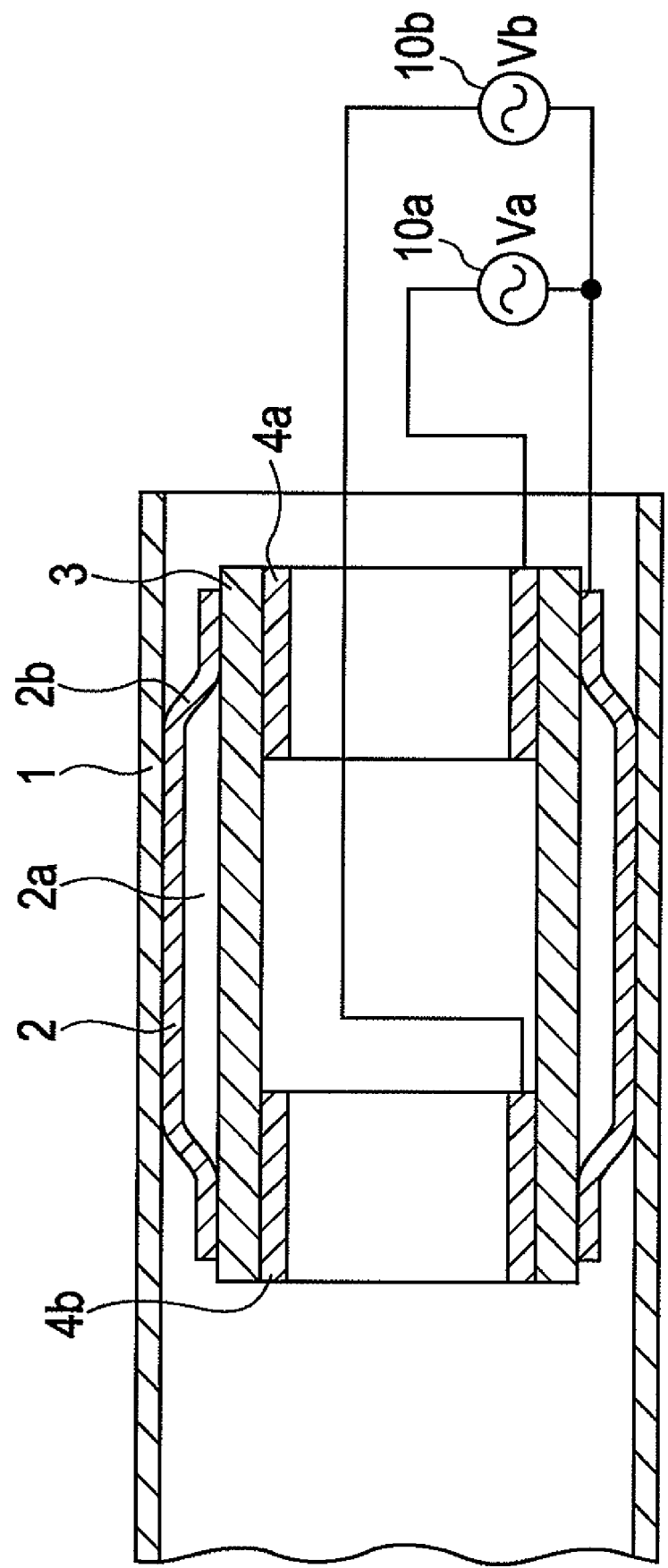
FIG. 1 is a sectional view showing an actuator according to a first exemplary embodiment of the present invention.

FIG. 1 shows an actuator according to a first exemplary embodiment of the present invention. A tubular member 1 is a cylindrical member functioning as a stator. A vibrator 2 is a cylindrical member. A diameter of an axial central portion of the vibrator 2 is larger than that of end portions thereof and the vibrator has a central-portion-swollen shape. This swollen portion is arranged to fit the tubular member 1. The vibrator 2 is formed of metal, such as stainless, or metal glass. A piezoelectric element 3 is a cylindrical member and is fixed to an inner surface of the vibrator 2 at both end portions. A gap 2a is formed between the central portion of the vibrator 2 and the piezoelectric element 3.

A first electrode (segmented electrode) 4a and a second electrode (segmented electrode) 4b are provided at the respective end portions of the inner surface of the piezoelectric element 3. Alternating power supplies 10a and 10b apply vibration voltages across the first electrode 4a and the vibrator 2 and across the second electrode 4b and the vibrator 2, whereby the piezoelectric element 3 vibrates. Accordingly, the vibrator 2 also functions as a common electrode. The vibration of the piezoelectric element 3 is amplified by the vibrator 2 and a change in a friction force generated at a contact portion of the vibrator 2 and the tubular member 1 is converted into a driving force, whereby a mover including the vibrator 2 and the piezoelectric element 3 relatively moves in an axial direction of the tubular member 1.

Figure 2A:
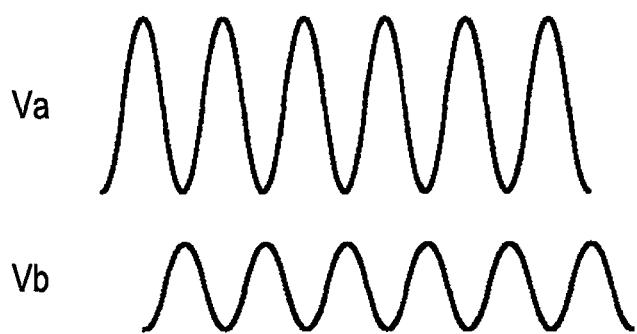
FIGS. 2A to 2C are schematic diagrams illustrating a state where a traveling wave is generated in an actuator shown in FIG. 1.
Figure 2B:
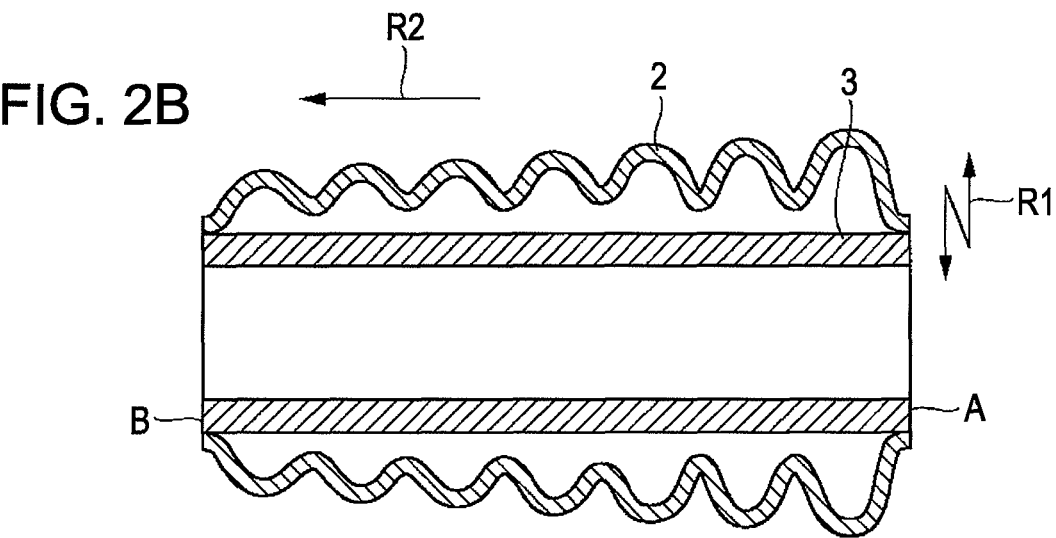
Figure 2C:
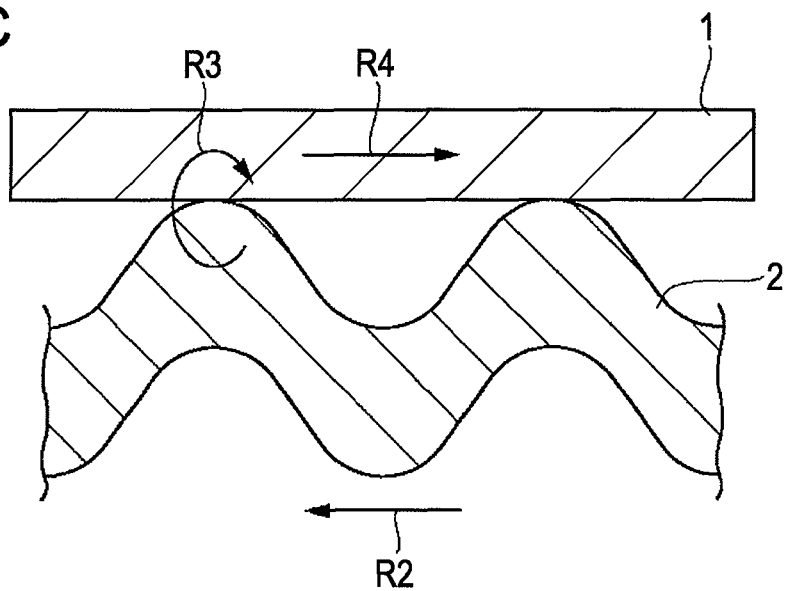

FIGS. 2A to 2C are schematic diagrams illustrating a principle of converting vibration of the vibrator 2 into a driving force. FIGS. 2A to 2C exaggeratedly show the vibration amplitude for the purpose of explanation. Referring to FIG. 2A, a sine-wave vibration voltage Va is applied across the first electrode 4a and the vibrator 2 by the alternating power supply 10a.

As shown by FIG. 2B, the vibration voltage Va applied across the first electrode 4a and the vibrator 2 causes the cylindrical piezoelectric element 3 to vibrate in a diameter direction shown by an arrow R1. This vibration causes the vibrator 2 to vibrate in a vibration mode having a vibration amplitude in the diameter direction at the end portion of the vibrator 2 near the first electrode 4a.

The vibration generated at the end portion of the vibrator 2 near the first electrode 4a is converted into a traveling wave that travels in the axial direction of the vibrator 2, which is shown by an arrow R2 along the vibrator 2. The amplitude of this traveling wave gradually becomes smaller due to the friction between the vibrator 2 and the tubular member 1 in contact with the vibrator 2 and the internal damping of the vibrator 2, and reaches the end portion of the vibrator 2 near the second electrode 4b.

In this exemplary embodiment, the mover including the vibrator 2 and the piezoelectric element 3 is relatively moved in the axial direction of the tubular member 1 utilizing this traveling wave. In general, a wave whose wave front travels in one direction is referred to as a traveling wave, whereas a wave whose wave front does not travel due to an interference with a wave reflected at an end portion is referred to as a standing wave. To prevent the traveling wave from becoming the standing wave due to the reflection, the vibration has to be absorbed at the end portion opposite to the vibration-generating side.

Accordingly, as shown in FIG. 2A, the alternating power supply 10b applies a sine-wave vibration voltage Vb across the second electrode 4b and the vibrator 2 in this exemplary embodiment. The vibration voltage Vb has the same frequency as the vibration voltage Va but has different phase and amplitude. By optimizing the phase and amplitude of the vibration voltage Vb, the above-described traveling wave can be absorbed on the side of the second electrode 4b of the vibrator 2. That is, the traveling wave is maintained without being converted into the standing wave.

FIG. 2C is a schematic diagram illustrating a principle of relatively moving a mover including the vibrator 2 and the piezoelectric element 3 in the axial direction of the tubular member 1 using a traveling wave that travels in a direction of an arrow R2.

A traveling wave that travels in the direction shown by the arrow R2 is generated in the vibrator 2, which is in contact with the tubular member 1. The traveling wave causes the vibrator 2 to elliptically vibrate in a direction shown by an arrow R3. This elliptic vibration pushes the tubular member 1 that is in contact with the vibrator 2 in a direction shown by an arrow R4, which is opposite to the direction of the traveling wave. In this manner, the tubular member 1 relatively moves in the direction of the arrow R4 with respect to the vibrator 2.

At this time, as the amplitude of the elliptic vibration increases, the force (driving force) of pushing the tubular member 1 becomes stronger and the movement speed increases, which is thus preferable as characteristics of an actuator. In this exemplary embodiment, the vibration of the piezoelectric element 3 is amplified using the vibrator 2. At this time, the amplitude is amplified utilizing a natural vibration mode of the vibrator 2. More specifically, if vibration is applied to a portion near a "node" of the vibration mode, a significantly large amplitude is obtained at a portion near a "loop" of the vibration mode due to resonance. Accordingly, the amplitude of the vibration of the vibrator 2 can be increased using resonance by setting frequencies of the vibration voltages Va and Vb to match the natural frequency of the vibrator 2.

Meanwhile, to change the moving direction of the actuator, the traveling direction of the traveling wave is changed to the opposite direction. More specifically, the vibration voltage Va is applied across the second electrode 4b and the vibrator 2 and the vibration voltage Vb is applied across the first electrode 4a and the vibrator 2.

Smooth R-shaped connection portions 2b of the vibrator 2 are formed at portions near the respective end portions. The durability can be significantly improved with this R-shape. Since this connection portion 2b includes a region receiving strong stress caused by the excitation force of the piezoelectric element 3, it is important to smoothly connect this region particularly. This R-shape prevents the stress from focusing on one point and improves the strength of the vibrator 2. As a result, the durability is improved and vibration can be generated at a larger amplitude, which makes it possible to provide an actuator capable of performing high-speed driving.

FIGS. 3A to 3D are schematic diagrams illustrating a method for manufacturing the vibrator 2.

Figure 3A:
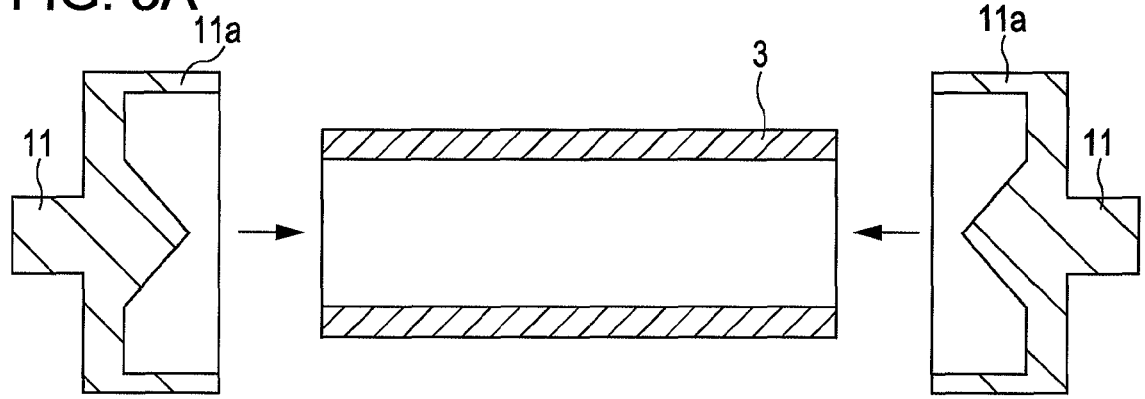
FIGS. 3A to 3D are schematic diagrams illustrating a method for manufacturing an actuator shown in FIG. 1.

As shown in FIG. 3A, first caps 11 are put on the respective ends of the cylindrical piezoelectric element 3. Each cap 11 has a mask portion 11a having an inside diameter larger than an outside diameter of the piezoelectric element 3. The mask portion 11a masks the respective end portions of the piezoelectric element 3.

Figure 3B:
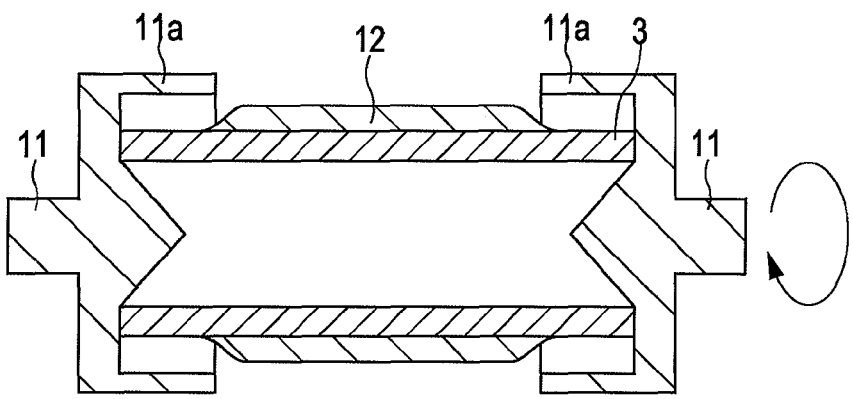

As shown in FIG. 3B, the piezoelectric element 3 with the first caps 11 on, is then put into a spatter film deposition apparatus (not shown) and a sacrificial layer 12 is formed while rotating the piezoelectric element 3. At this time, since the above-described mask portions 11a exist, the thickness of the sacrificial layer 12 gradually decreases toward the ends. A metal dissolvable in acid and alkali, such as aluminum, and a macromolecular material dissolvable in organic solvent can be used as a material of the sacrificial layer 12.

Figure 3C:
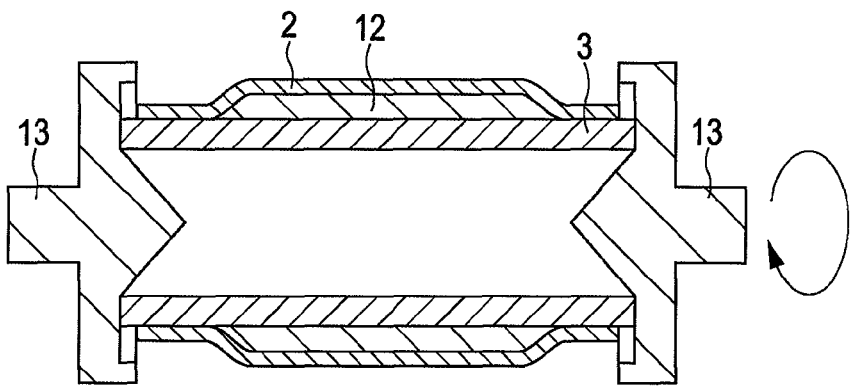

As shown in FIG. 3C, second caps 13 are then put on the respective ends of the piezoelectric element 3. A film serving as the vibrator 2 is formed on the sacrificial layer 12 while rotating the piezoelectric element 3. A material highly resistant to repeatedly applied stress is preferable as a material of the vibrator 2. For example, a material of stainless series or a material of metallic glass series is preferable. Particularly, the metallic glass is composed of amorphous metal atoms. Since the metallic glass is amorphous, the metallic glass shows high durability unlike a normal metal. More specifically, the amorphous has a high hardness and can improve the abrasion resistance. In addition, manufacture of the tubular member 1 with the metallic glass can improve the abrasion resistance. As a result, an actuator having much higher durability can be realized.

Figure 3D:
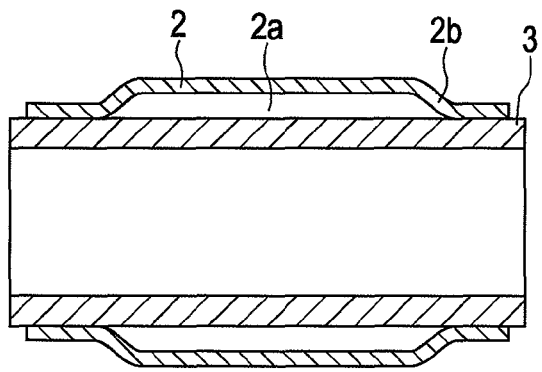

As shown in FIG. 3D, the sacrificial layer 12 is then dissolved to form a gap 2a between the vibrator 2 and the piezoelectric element 3. At this time, to bring solvent for dissolving the sacrificial layer 12 into contact with the sacrificial layer 12, the vibrator 2 having a plurality of minute holes formed using a laser or the like can be used. Since formation of the holes in the vibrator 2 allows compressed air to escape through the holes even if the air existing in the gap adjacent to the contact portion is compressed, the pressure does not increase. Accordingly, levitation of the vibrator 2 can be prevented. As a result, the thrust does not decrease even if the vibrator 2 vibrates at a large amplitude.

The connection portion 2b of the vibrator 2 and the piezoelectric element 3 can be formed in a smooth R-shape by manufacturing the vibrator 2 in this manner.

Although the vibrator 2 serves as a common electrode in this exemplary embodiment, a conductive thin film serving as the common electrode may be provided on one side of the piezoelectric element 3. However, since one electrode can be omitted when the conductive vibrator 2 is used as the common electrode, the structure can be simplified.

In addition, the gap between the vibrator 2 and the piezoelectric element 3 may be filled with a sufficiently soft material that does not affect vibration of the vibrator 2. A silicon rubber having low hardness is preferable as such a soft material. If such a soft material is used as the sacrificial layer 12 at the above-described manufacturing step and the sacrificial layer is left as it is, the manufacture becomes easier and the cost is advantageously reduced since a step of removing the sacrificial layer 12 is not needed.

If the vibrator 2 is partially brought into contact with and out of contact with the tubular member 1 serving as a supporting member repeatedly in response to vibration of the vibrator 2, the air pressure may prevent the vibrator 2 from being in contact with the tubular member 1. This phenomenon is called ultrasonic levitation. The plurality of minute holes formed in the vibrator 2 can prevent this ultrasonic levitation.

MODIFIED EXAMPLE 1

Figure 4A:
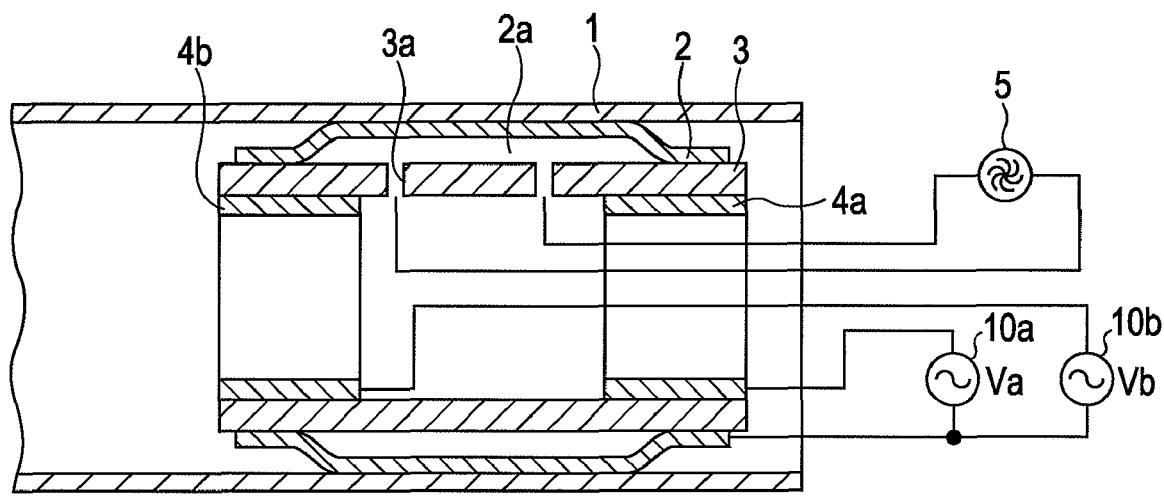
FIGS. 4A and 4B are sectional diagrams showing first and second modified examples according to a first exemplary embodiment of the present invention, respectively.

Instead of using the vibrator 2 having minute holes formed thereon, holes 3a are formed on the piezoelectric element 3 in advance and may be filled with the same material as the sacrificial layer 12, as shown in FIG. 4A. By connecting the holes 3a provided on the piezoelectric element 3 to a passage to be connected to a refrigerant circulation pump 5, the refrigerant can be circulated through the gap 2a. If the piezoelectric element 3 is vibrated at a high speed and a large amplitude, an amount of generated heat increases. By introducing the refrigerant to the gap 2a between the piezoelectric element 3 and the vibrator 2, this heat can be removed. As a result, an increase in the temperature of the piezoelectric element 3 and the vibrator 2 can be suppressed.

MODIFIED EXAMPLE 2

Figure 4B:
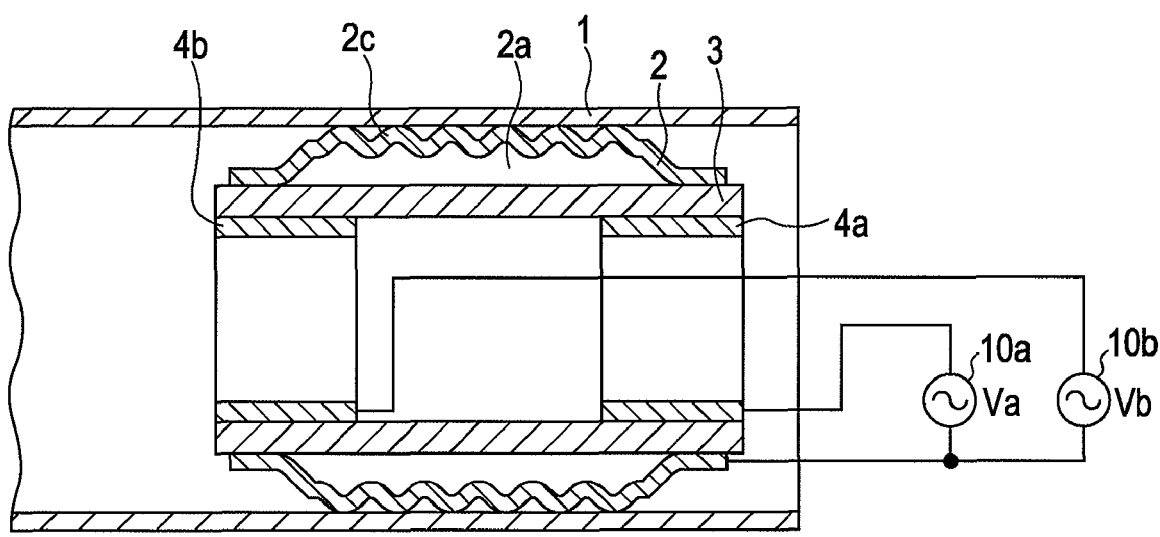

The contact portion of the vibrator 2 and the tubular member 1 does not have to be flat. The vibrator 2 may be in the shape of a corrugated plate having a wave-shape portion 2c as shown in FIG. 4B. The vibrator 2 in the shape of the corrugated plate can be readily manufactured by forming netlike masking at the time of deposition of the sacrificial layer 12.

During vibration of the vibrator 2, the pressure of air existing between the vibrator 2 and the tubular member 1 levitates the vibrator 2. That is, so-called ultrasonic levitation is caused. However, since the corrugated plate of the vibrator 2 allows compressed air to escape from the grooves of the corrugated plate even if the air existing in the gap adjacent to the contact portion is compressed, the pressure does not increase. Accordingly, the levitation of the vibrator 2 can be prevented. As a result, the thrust does not reduce even if the vibrator 2 vibrates at a large amplitude.

Second Exemplary Embodiment

Figure 5:
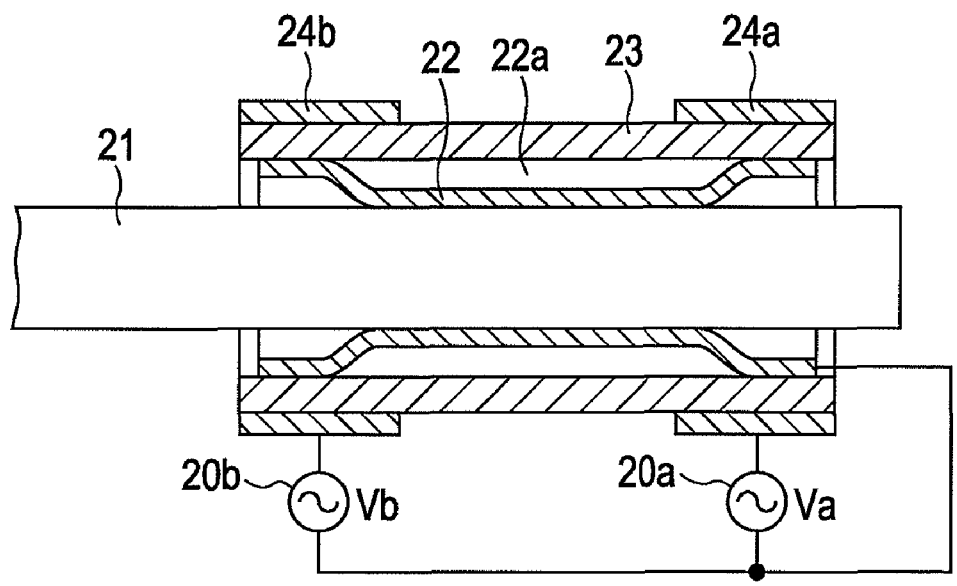
FIG. 5 is a sectional view showing an actuator according to a second exemplary embodiment of the present invention.

FIG. 5 is a sectional view showing an actuator according to a second exemplary embodiment of the present invention. Referring back to FIG. 1 showing the actuator according to the first exemplary embodiment, the mover including the vibrator 2 and the piezoelectric element 3 relatively moves inside of the tubular member 1. On the other hand, in this exemplary embodiment, a mover including a cylindrical vibrator 22 and a piezoelectric element 23 relatively moves outside of a tubular member 21, which is a solid pipe.

The vibrator 22 is a cylindrical member. The diameter of an axial central portion is smaller than that of end portions. The vibrator 22 is in a shape in which the central portion is concave. This concave portion is arranged to fit the tubular member 21. A piezoelectric element 23 is a cylindrical member and is fixed to an outer surface of the vibrator 22 at both end portions. A gap 22a is formed between the central portion of the vibrator 22 and the piezoelectric element 23.

A first electrode (segmented electrode) 24a and a second electrode (segmented electrode) 24b are provided at the respective end portions of the outer surface of the piezoelectric element 23. Alternating power supplies 20a and 20b apply vibration voltages Va and Vb across the first electrode 24a and the vibrator 22 and across the second electrode 24b and the vibrator 22, respectively, whereby the piezoelectric element 23 vibrates. Accordingly, the vibrator 22 also functions as a common electrode. The vibration of the piezoelectric element 23 is amplified by the vibrator 22 and a change in a friction force generated at a contact portion of the vibrator 22 and the tubular member 21 is converted into a driving force, whereby a mover including the vibrator 22 and the piezoelectric element 23 relatively moves in an axial direction of the tubular member 21.

Meanwhile, since the same driving method as that of the first exemplary embodiment is employed in this exemplary embodiment, a description thereof is omitted here. In addition, this exemplary embodiment offers advantages similar to those of the first exemplary embodiment.

Third Exemplary Embodiment

Figure 6:
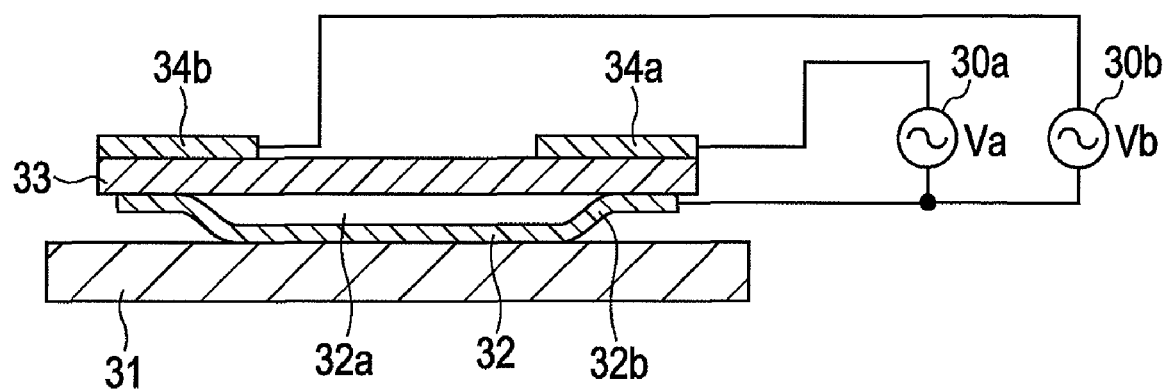
FIG. 6 is a sectional view showing an actuator according to a third exemplary embodiment of the present invention.

FIG. 6 is a sectional view showing an actuator according to a third exemplary embodiment of the present invention. In this exemplary embodiment, a plate-like body 31, which is a plate-like supporting member, and a mover including a plate-like vibrator 32 and a plate-like piezoelectric element 33 are used. Both end portions of the vibrator 32 are fixed to the piezoelectric element 33. A gap 32a is formed at a central portion serving as a vibration portion.

Smooth connection portions 32b of the plate-like vibrator 32 are connected to the piezoelectric element 33 at portions near the respective end portions. An R-shape of the connection portion 32b can significantly improve the durability. A central portion of the vibrator 32 is in contact with the plate-like body 31. Here, suppose that a direction of gravity is the downward direction. At this time, since the vibrator 32 is pressed onto the plate-like body 31 due to the weight thereof, the vibrator 32 is not levitated and the contact state is maintained.

As in the case of the above-described first exemplary embodiment, a first electrode 34a and a second electrode 34b are provided on the respective end portions of the piezoelectric element 33. Alternating power supplies 30a and 30b apply vibration voltages Va and Vb across the first electrode 34a and the vibrator 32 and across the second electrode 34b and the vibrator 32, respectively, whereby the piezoelectric element 33 vibrates. The vibration of the piezoelectric element 33 generated by the vibration voltages Va and Vb is transferred to the vibrator 32 and generates a traveling wave in the vibrator 32. The vibrator 32 moves relative to the plate-like body 31 in contact with the vibrator 32.

According to this exemplary embodiment, since the supporting member can be constituted by a plate-like member, the vibrator 32 can be manufactured simply by using a film deposition method, such as spattering. In addition, the above-described force of gravity is not only the force that can be utilized, and forces generated with a spring and a magnet can also be utilized as the pressing force for keeping the vibrator 32 in contact with the plate-like body 31 serving as the supporting member.

Fourth Exemplary Embodiment

A fourth exemplary embodiment of the present invention will now be described with reference to FIG. 7 to FIG. 9B. In this exemplary embodiment, a description will be given on a configuration of a linear actuator utilizing a standing wave instead of a traveling wave utilized in the first exemplary embodiment. Through FIG. 7 to FIG. 9B, the same or like numerals are attached to members common to those shown in FIG. 1 and a description thereof is omitted.

A difference between FIG. 7 and FIG. 1 is that the first electrode 4a and the second electrode 4b are replaced with an electrode 4 which is formed on an inner surface of a piezoelectric element 3 in FIG. 7. In addition, a vibration voltage V1 of an alternating power supply 40a and a vibration voltage V2 of an alternating power supply 40b are combined by an adding circuit 6 and are applied across a vibrator 2 and the electrode 4 as a third vibration voltage V3. Accordingly, the third vibration voltage V3 is applied to both ends of the vibrator 2.

A description will be given on a principle of relatively moving a mover including the vibrator 2 and the piezoelectric element 3 in an axial direction of a tubular member 1 using the vibration voltage V3, which is a standing wave.

Figure 8A:
FIGS. 8A to 8C are schematic diagrams illustrating driving signals used in an actuator shown in FIG. 7.
Figure 9A:
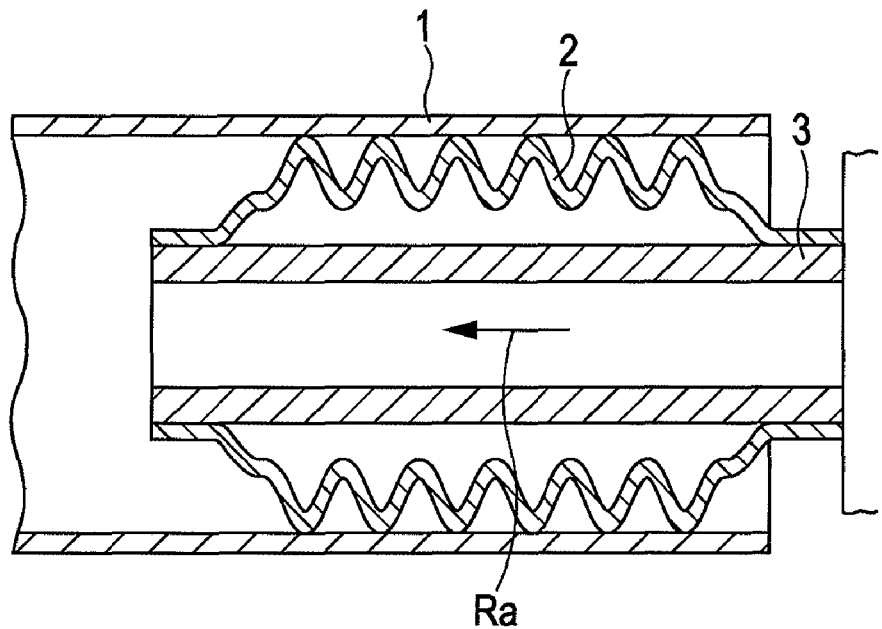
FIGS. 9A and 9B are schematic diagrams illustrating a method of driving an actuator shown in FIG. 7.

If the alternating power supply 40a applies the first vibration voltage V1 shown in FIG. 8A across the vibrator 2 and the electrode 4, the piezoelectric element 3 vibrates in the diameter direction. The first vibration voltage V1 intermittently fluctuates at a frequency matching a natural frequency of the vibrator 2. Propagation of this vibration to the vibrator 2 vibrates the vibrator 2 and a standing wave that fluctuates in the diameter direction in a vibration mode having a vibration amplitude is generated as shown in FIG. 9A. This standing wave is a natural vibration mode of the vibrator 2, resonates at a predetermined frequency, and can provide a large amplitude. Based on this vibration, the tubular member 1 arranged on the outer side of the vibrator 2 is repeatedly brought into contact with and out of contact with the vibrator 2.

Figure 8B:
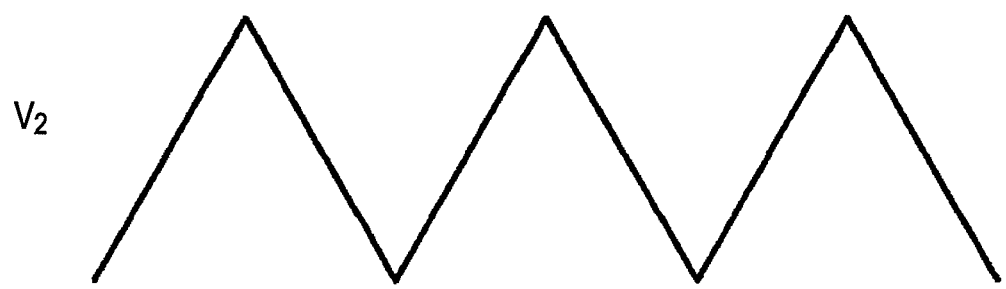
Figure 9B:
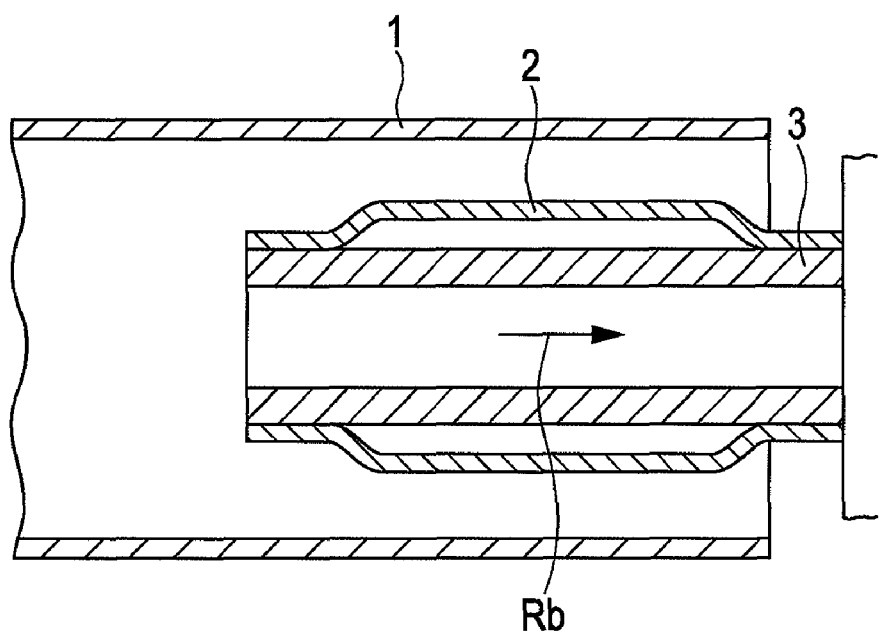

If the alternating power supply 40b applies the second vibration voltage V2 shown in FIG. 8B across the vibrator 2 and the electrode 4, the piezoelectric element 3 deforms not only in the diameter direction but also in the axial direction indicated by arrows Ra and Rb shown in FIGS. 9A and 9B, respectively. The piezoelectric element 3 repeats a motion of expanding in the direction of the arrow Ra and a motion of shrinking in the direction of the arrow Rb.

Accordingly, if the first vibration voltage V1 is applied at the time of expansion of the piezoelectric element 3 in the direction of the arrow Ra caused by the second vibration voltage V2, the vibrator 2 is brought into contact with the tubular member 1 and the tubular member 1 can be pushed in the direction of the arrow Ra by a friction force. Conversely, if the level of the first vibration voltage V1 is lowered to make the vibration amplitude smaller at the time of shrinkage of piezoelectric element 3 in the direction of the arrow Rb caused by the second vibration voltage V2, the friction force between the vibrator 2 and the tubular member 1 becomes significantly small and the tubular member 1 is kept fixed.

Figure 8C:
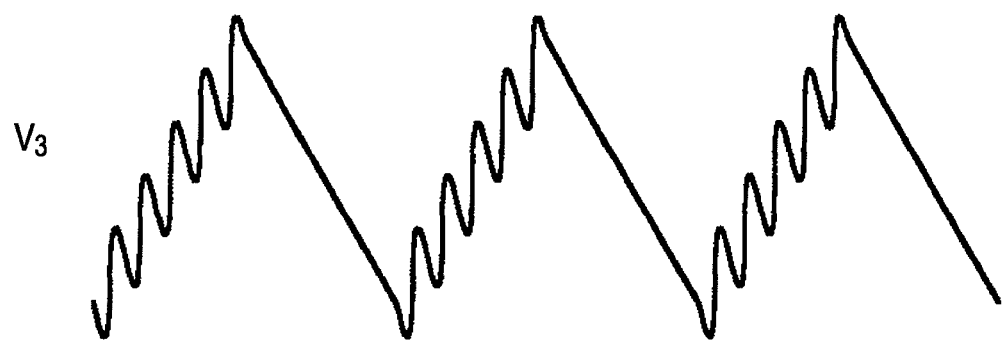

Accordingly, states shown in FIGS. 9A and 9B are repeated by applying the third vibration voltage V3, shown in FIG. 8C, obtained by combining the first vibration voltage V1 and the second vibration voltage V2. This relatively moves the mover including the vibrator 2 and the piezoelectric element 3 in the axial direction of the tubular member 1.

Figure 10:
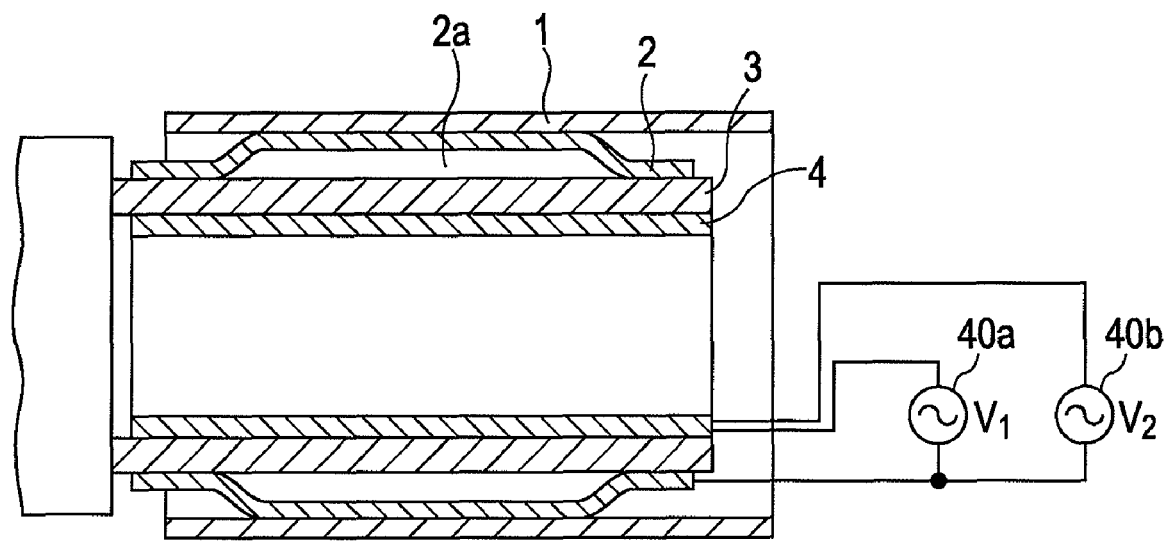
FIG. 10 is a sectional view showing a modified example of an actuator according to a fourth exemplary embodiment of the present invention.

Meanwhile, the vibration voltages V1 and V2 may be separately applied instead of using the above-described third vibration voltage V3 in a method of vibrating the piezoelectric element 3 using two kinds of vibration voltage V1 and V2. In this case, the actuator has to be configured so that the vibration voltages V1 and V2 can be separately applied to the electrode 4 as shown in FIG. 10.

To change the moving direction of the actuator, the first vibration voltage V1 is applied at the time of shrinkage of the piezoelectric element 3 in the direction of the arrow Rb and the level of the first vibration voltage V1 is lowered at the time of expansion of the piezoelectric element 3 in the direction of the arrow Ra. Accordingly, the moving direction can be changed by changing the phases of two kinds of vibration voltage V1 and V2.

Fifth Exemplary Embodiment

Figure 11:
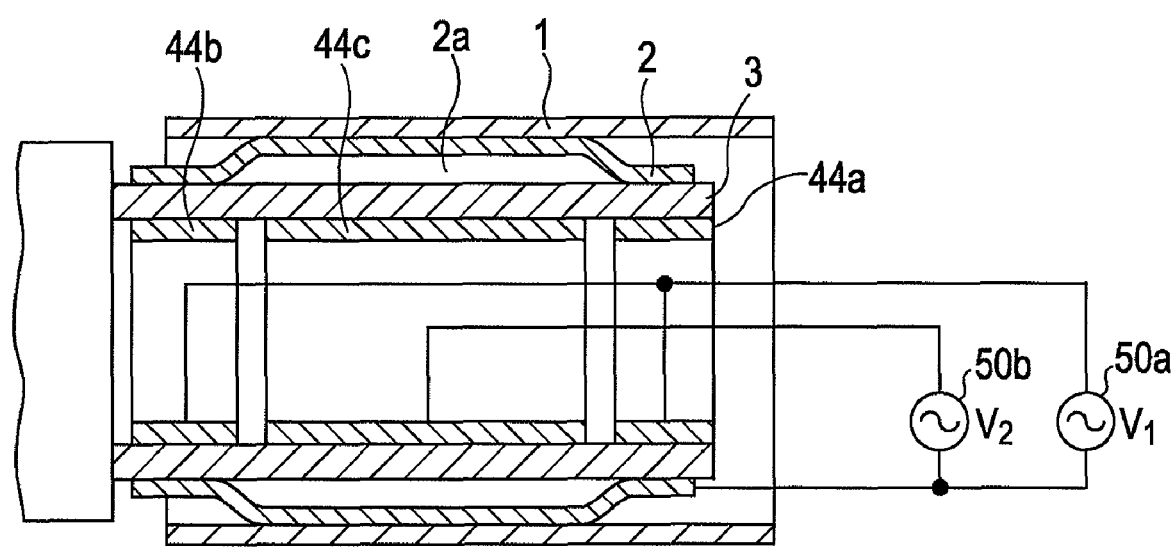
FIG. 11 is a sectional view showing an actuator according to a fifth exemplary embodiment of the present invention.

FIG. 11 is a sectional view showing an actuator according to a fifth exemplary embodiment of the present invention. A difference between this exemplary embodiment and the fourth exemplary embodiment is that the electrode 4 is segmented into three. As shown in FIG. 11, two electrodes (segmented electrodes) 44a and 44b are located at respective end portions and an electrode (segmented electrode) 44c is located at a central portion.

A vibration voltage V1 of an alternating power supply 50a is applied to the electrodes 44a and 44b. A vibration voltage V2 of an alternating power supply 50b is applied to the electrode 44c located at the central portion. If the vibration voltage V1 is applied to both end portions at the same time of shrinkage of a piezoelectric element 3 in the axial direction caused by the vibration voltage V2, a vibrator 2 is vibrated and the wave front of the standing wave touches a tubular member 1. By repeating this action, a mover including the vibrator 2 and the piezoelectric element 3 relatively moves in the axial direction of the tubular member 1.

Sixth Exemplary Embodiment

Figure 12:
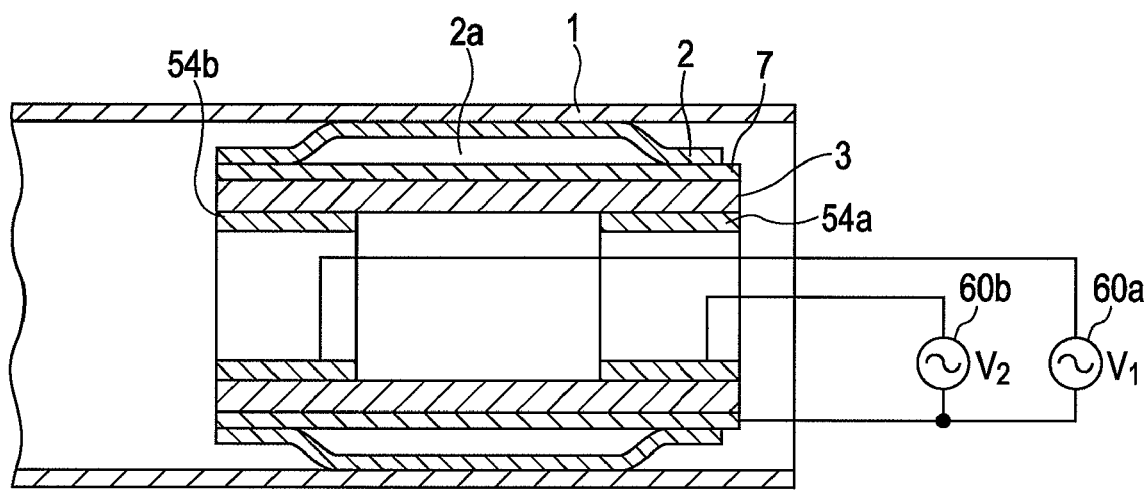
FIG. 12 is a sectional view showing an actuator according to a sixth exemplary embodiment of the present invention.

FIG. 12 is a sectional view showing an actuator according to a sixth exemplary embodiment of the present invention. Unlike the above-described fourth exemplary embodiment, the electrode 4 is segmented into two in this exemplary embodiment. As shown in FIG. 12, two electrodes (segmented electrodes) 54a and 54b are provided at respective end portions. In addition, a common electrode 7 is provided between a vibrator 2 and a piezoelectric element 3.

Vibration voltages V1 and V2 of alternating power supplies 60a and 60b, respectively, are applied to the electrodes 54b and 54a, respectively. If the vibration voltage V1 is applied to both end potions at the same time of shrinkage of a piezoelectric element 3 in the axial direction caused by the vibration voltage V2, the vibrator 2 is vibrated and the wave front of the standing wave touches a tubular member 1. By repeating this action, a mover including the vibrator 2 and the piezoelectric element 3 relatively moves in the axial direction of the tubular member 1.

Since the common electrode 7 is provided separately from the vibrator 2, the electrode can be formed using a low-resistance material, such as, for example, copper and gold. Since generation of heat due to the current flowing through the electrodes can be suppressed, an increase in temperature is advantageously suppressed.

Seventh Exemplary Embodiment

Figure 13:
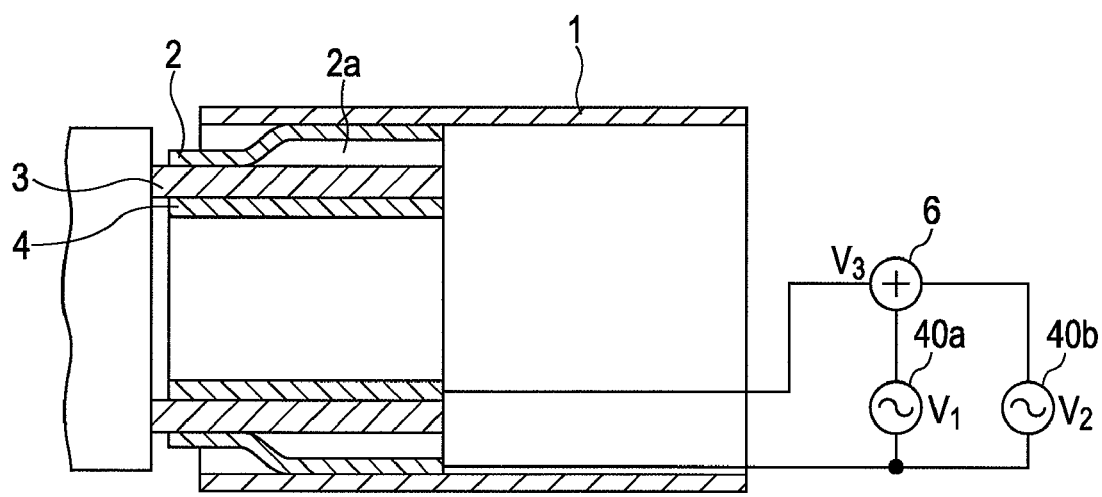
FIG. 13 is a sectional view showing an actuator according to a seventh exemplary embodiment of the present invention.
Figure 14A:
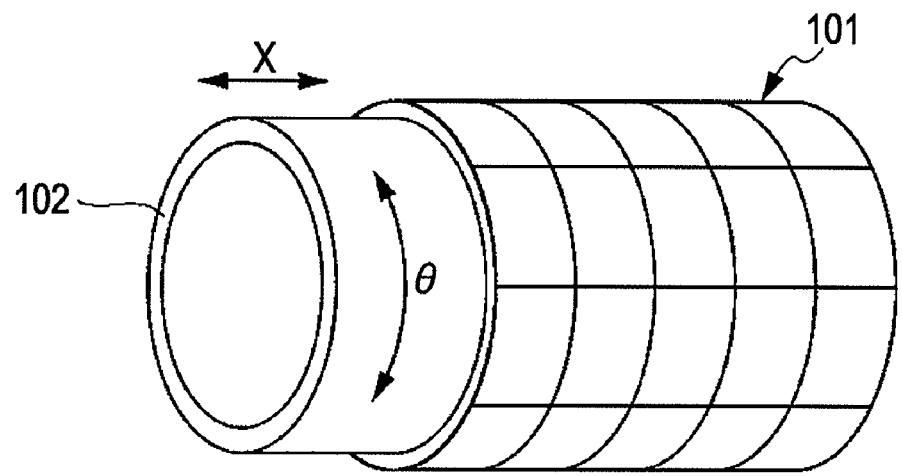
FIGS. 14A and 14B are schematic diagrams showing an actuator according to the related art.
Figure 14B:
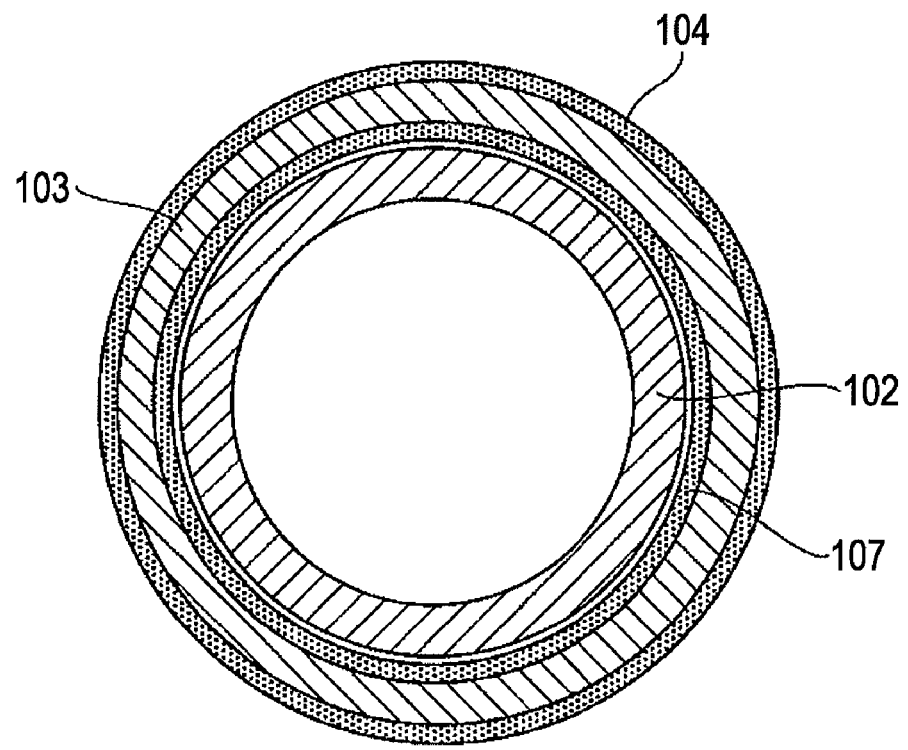
Figure 15:
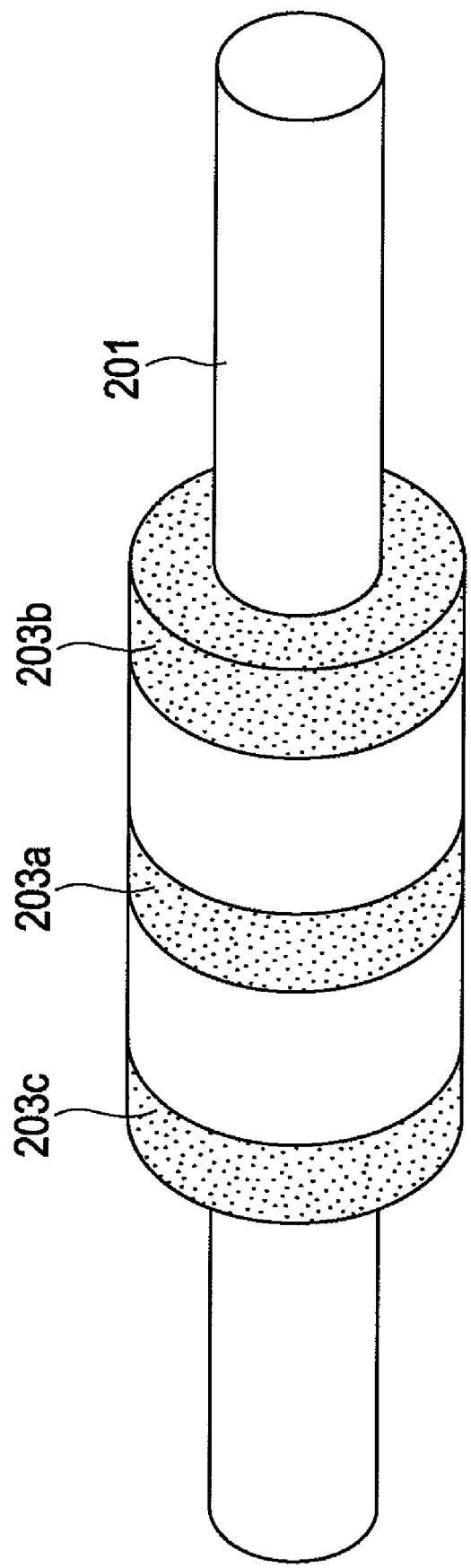
FIG. 15 is a schematic diagram showing an actuator according to the related art.

FIG. 13 is a sectional view showing an actuator according to a seventh exemplary embodiment of the present invention. In this exemplary embodiment, the mover including the vibrator 2 and the piezoelectric element 3 according to the fourth exemplary embodiment is cut into half at a plane vertical to the axis, resulting in a vibrator 2, a piezoelectric element 3, an electrode 4, and a gap 2a. The same driving method as that of the fourth exemplary embodiment is employed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application Nos. 2007-189001 filed Jul. 20, 2007 and 2008-155357 filed Jun. 13, 2008, which are hereby incorporated by reference herein in their entirety.

What is claimed is:

1. An actuator that moves a mover along a supporting member, comprising:
 a supporting member;
 a mover arranged to relatively move along the supporting member, the mover including
 a piezoelectric element,
 a first electrode provided at one end portion of a first surface of the piezoelectric element,
 a second electrode provided at the other end portion of the a first surface of the piezoelectric element, and
 a vibrator, wherein one end of the vibrator is fixed to a reverse surface to the first surface of the piezoelectric element, the other end of the vibrator is fixed to the reverse surface to the first surface of the piezoelectric element, and a central portion of the vibrator is arranged to be in contact with the supporting member; and
 a power supply unit arranged to apply a voltage to the first electrode, the second electrode, and the vibrator,
 wherein a voltage is applied across the first electrode and the vibrator and a voltage is applied across the second electrode and the vibrator to vibrate the piezoelectric element, the vibration of the piezoelectric element is amplified by the vibrator, which thereby moves the mover along the supporting member.

2. The actuator according to claim 1, wherein the supporting member is a tubular member, the piezoelectric element is a tubular member, the vibrator is a tubular member located on an outer side of the piezoelectric element, and the mover including the vibrator and the piezoelectric element moves in an axial direction of the supporting member along an inner surface of the supporting member.

3. The actuator according to claim 1, wherein the supporting member is a cylindrical member or a columnar member, the piezoelectric element is a tubular member, the vibrator is a tubular member located on an inner side of the piezoelectric element, and the mover including the vibrator and the piezoelectric element moves in an axial direction of the supporting member along an outer surface of the supporting member.

4. The actuator according to claim 1, wherein the supporting member is a plate-like member, the piezoelectric element is a plate-like member, the vibrator is a plate-like member located between the supporting member and the piezoelectric element, and the mover including the vibrator and the piezoelectric element moves along an upper surface of the supporting member.

5. The actuator according to claim 1, wherein the mover is . moved by a friction generated at a contact portion of the supporting member and a wave front of the move.

6. The actuator according to claim 1, wherein the vibration of the piezoelectric element is a traveling wave generated at a vibration portion of the vibrator by applying voltages having a same frequency but different phases and amplitudes across the first electrode and the vibrator and across the second electrode and the vibrator.

7. The actuator according to claim 1, wherein the vibration of the piezoelectric element is a standing wave generated at the vibration portion of the vibrator by alternately applying a combined wave of a first vibration voltage that causes the piezoelectric element to shrink in an axial direction and an intermittent second vibration voltage that has a same frequency as a natural frequency of the vibrator at a time of an increase or a decrease in the first vibration voltage across the first electrode and the vibrator and across the second electrode and the vibrator.

8. The actuator according to claim 2, wherein a plurality of minute holes are provided in the vibrator.

9. The actuator according to claim 2, wherein the vibrator is in a shape of a corrugated plate.

10. The actuator according to claim 2, wherein a portion between a vibration portion of the vibrator and the piezoelectric element is filled with a soft material.

11. The actuator according to claim 2, wherein a piping unit arranged to introduce a refrigerant to a portion between a vibration portion of the vibrator and the piezoelectric element and to circulate the refrigerant is provided.

12. The actuator according to claim 2, wherein a vibration portion of the vibrator or the supporting member is formed of metallic glass.

13. An actuator that moves a mover along a supporting member, comprising:
 a tubular supporting member;
 a mover arranged to relatively move in an axial direction of the supporting member along an inner surface of the supporting member, the mover including
 a tubular piezoelectric element,
 a first electrode provided on an inner surface of the piezoelectric element, and
 a vibrator, wherein both ends of the vibrator are fixed to an outer surface of the piezoelectric element and a central portion of the vibrator is arranged to be in contact with the supporting member; and
 a power supply unit arranged to apply a voltage to the first electrode and the vibrator,
 wherein the voltage is applied across the first electrode and the vibrator to generate a standing wave in the piezoelectric element, the vibration of the piezoelectric element is amplified by the vibrator, which thereby moves the mover in the axial direction of the supporting member.

14. The actuator according to claim 13, wherein the vibration of the piezoelectric element is the standing wave generated by applying a combined wave of a first vibration voltage that causes the piezoelectric element to shrink in the axial direction and an intermittent second vibration voltage that has a same frequency as a natural frequency of the vibrator at a time of an expansion of the piezoelectric element.

15. The actuator according to claim 13, wherein the voltage comprises a first vibration voltage and a second vibration voltage, and wherein the standing wave is generated by independently applying the first vibration voltage that causes the piezoelectric element to shrink in the axial direction and the second vibration voltage that has a same frequency as a natural frequency of the vibrator and is applied intermittently at a time of an increase or a decrease in the first vibration voltage.

16. An actuator that moves a mover along a supporting member, comprising:
  a tubular supporting member;
  a mover arranged to move in an axial direction of the supporting member along an inner surface of the supporting member, the mover including
    a tubular piezoelectric element,
    a first electrode provided at one end portion of an inner surface of the piezoelectric element, and
    a second electrode provided at the other end potion of the inner surface of the piezoelectric element, and
    a vibrator, wherein one end of the vibrator is fixed to an outer surface of the piezoelectric element facing the first electrode, the other end of the vibrator is fixed to the outer surface of the piezoelectric element facing the second electrode, and a central portion of the vibrator which is arranged to be in contact with the supporting member; and
  a power supply unit arranged to apply a voltage to the first electrode, the second electrode, and the vibrator,
  wherein a combined wave of a first vibration voltage that causes the piezoelectric element to shrink or expand in the axial direction and an intermittent second vibration voltage that has a same frequency as a natural frequency of the vibrator at a time of an expansion of the piezoelectric element is alternately applied across the first electrode and the vibrator and across the second electrode and the vibrator to vibrate the piezoelectric element, the vibration of the piezoelectric element is amplified by the vibrator, which thereby moves the mover in the axial direction of the supporting member.

17. An actuator that moves a mover along a supporting member, comprising:
  a tubular supporting member;
  a mover arranged to move in an axial direction of the supporting member along an inner surface of the supporting member, the mover including
    a tubular piezoelectric element,
    a first electrode provided at one end portion of an inner surface of the piezoelectric element, and
    a second electrode provided at the other end portion of the inner surface of the piezoelectric element,
    a third electrode provided at a central portion of the inner surface of the piezoelectric element, and
    a vibrator, wherein one end of the vibrator is fixed to an outer surface of the piezoelectric element facing the first electrode, the other end of the vibrator is fixed to the outer surface of the piezoelectric element facing the second electrode, and a central portion of the vibrator is arranged to be in contact with the supporting member; and
  a power supply unit arranged to apply a voltage to the first electrode, the second electrode, the third electrode, and the vibrator,
  wherein a combined wave of a first vibration voltage that causes the piezoelectric element to shrink or expand in the axial direction and an intermittent second vibration voltage that has a same frequency as a natural frequency of the vibrator at a time of an expansion of the piezoelectric is alternately applied across the first electrode and the vibrator, across the second electrode and the vibrator, and across the third electrode and the vibrator to vibrate the piezoelectric element, the vibration of the piezoelectric element is amplified by the vibrator, which thereby moves the mover in the axial direction of the supporting member.

18. An actuator that moves a mover along a supporting member, comprising:
  a tubular supporting member;
  a mover arranged to move in an axial direction of the supporting member along an inner surface of the supporting member, the mover including
    a tubular piezoelectric element,
    a first electrode provided at one end portion of an inner surface of the piezoelectric element, and
    a vibrator, wherein one end of the vibrator is fixed to an outer surface of the piezoelectric element facing the first electrode and the other end of the vibrator is arranged to be in contact with the supporting member; and
  a power supply unit arranged to apply a voltage to the first electrode and the vibrator,
  wherein a combined wave of a first vibration voltage that causes the piezoelectric element to shrink or expand in the axial direction and an intermittent second vibration voltage that has a same frequency as a natural frequency of the vibrator at a time of an expansion of the piezoelectric element is applied across the first electrode and the vibrator to vibrate the piezoelectric element, the vibration of the piezoelectric element is amplified by the vibrator, which thereby moves the mover in the axial direction of the supporting member.

19. An actuator that moves a mover along a supporting member, comprising:
  a tubular supporting member;
  a mover arranged to relatively move along an inner surface of the supporting member, the mover including
    a cylindrical vibrator, wherein one end portion and the other end portion of the vibrator are arranged to be in contact with an inner surface of the supporting member at a middle portion, a piezoelectric element arranged on the inner surface of the vibrator and a first electrode fixed to the inner surface of the piezoelectric element are provided at the one end portion, and a piezoelectric element arranged on the inner surface of the vibrator and a second electrode fixed to the inner surface of the piezoelectric element are provided at the other end portion;
  a power supply unit arranged to apply a voltage to the first electrode, the second electrode, and the vibrator,
  wherein a voltage is applied across the first electrode and the vibrator and a voltage is applied across the second electrode and the vibrator to vibrate the piezoelectric element, the vibration of the piezoelectric element is amplified by the vibrator, which thereby moves the mover along the supporting member.

20. An actuator that moves a mover along a supporting member, comprising:
  a cylindrical member or a columnar member supporting member;
  a mover arranged to relatively move along an outer surface of the supporting member, the mover including
    a cylindrical vibrator, wherein one end portion and the other end portion of the vibrator are arranged to be in contact with an inner surface of the supporting member at a middle portion, a piezoelectric element arranged on an outer surface of the vibrator and a first electrode fixed to the outer surface of the piezoelectric element are provided at the one end portion, and a piezoelectric element arranged on the outer surface of the vibrator and a second electrode fixed to the outer surface of the piezoelectric element are provided at the other end portion;
  a power supply unit arranged to apply a voltage to the first electrode, the second electrode, and the vibrator, wherein a voltage is applied across the first electrode and the vibrator and a voltage is applied across the second electrode and the vibrator to vibrate the piezoelectric element, the vibration of the piezoelectric element is amplified by the vibrator, which thereby moves the mover along the supporting member.

* * * * *